United States Patent
Robinson et al.

(10) Patent No.: US 11,668,946 B1
(45) Date of Patent: *Jun. 6, 2023

(54) INTERACTIVE VIRTUAL REALITY DISPLAY PROVIDING ACCOMMODATION DEPTH CUES

(71) Applicant: Holochip Corporation, Torrance, CA (US)

(72) Inventors: Samuel T. Robinson, Beverly Hills, CA (US); Robert G. Batchko, Torrance, CA (US); David Antonio Perez, Norwalk, CA (US)

(73) Assignee: Holochip Corporation, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,738

(22) Filed: May 18, 2021

Related U.S. Application Data

(63) Continuation of application No. 15/495,463, filed on Apr. 24, 2017, now Pat. No. 11,009,714.

(Continued)

(51) Int. Cl.
 *G02B 27/01* (2006.01)
 *G02B 25/00* (2006.01)
(Continued)

(52) U.S. Cl.
 CPC ....... *G02B 27/0179* (2013.01); *G02B 3/0081* (2013.01); *G02B 3/14* (2013.01); *G02B 25/001* (2013.01); *G02B 27/0172* (2013.01); *H04N 13/144* (2018.05); *H04N 13/344* (2018.05); *H04N 13/383* (2018.05); *H04N 13/398* (2018.05); *G02B 2027/0134* (2013.01); *G02B 2027/0185* (2013.01); *G02B 2027/0187* (2013.01)

(58) Field of Classification Search
 CPC .... G02B 27/0179; G02B 3/0081; G02B 3/14; G02B 25/001; G02B 27/0172; G02B 2027/0134; G02B 2027/0185; G02B 2027/0187; H04N 13/144; H04N 13/344; H04N 13/383; H04N 13/398
 See application file for complete search history.

(56) References Cited

U.S. PATENT DOCUMENTS 7,672,059 B2 3/2010 Batchko et al.
8,064,142 B2 11/2011 Batchko et al.
(Continued)

OTHER PUBLICATIONS

Final Office Action for U.S. Appl. No. 15/495,463, dated Apr. 22, 2020.

(Continued)

*Primary Examiner* — Tat C Chio
(74) *Attorney, Agent, or Firm* — JDI Patent; Joshua D. Isenberg; Robert Pullman

(57) ABSTRACT

An interactive display includes a display capable of generating displayed images, and first and second eyepiece assemblies each including one or more variable-focus lenses. The eyepiece assemblies, variable-focus lenses and display allow the user to perceive a virtual 3D image while providing visual depth cues that cause the eyes to accommodate at a specified fixation distance. The fixation distance can be adjusted by changing the focal power of the variable-focus lenses.

19 Claims, 3 Drawing Sheets

Related U.S. Application Data

(60) Provisional application No. 62/326,677, filed on Apr. 22, 2016.

(51) Int. Cl.
　　*G02B 3/00*　　　(2006.01)
　　*G02B 3/14*　　　(2006.01)
　　*H04N 13/144*　　(2018.01)
　　*H04N 13/344*　　(2018.01)
　　*H04N 13/383*　　(2018.01)
　　*H04N 13/398*　　(2018.01)

(56) References Cited

U.S. PATENT DOCUMENTS

| | | | |
|---|---|---|---|
| 8,503,875 B2 | 8/2013 | Szilagyi et al. | |
| 8,559,115 B2 | 10/2013 | Szilagyi et al. | |
| 8,605,361 B2 | 12/2013 | Batchko et al. | |
| 9,164,202 B2 | 10/2015 | Batchko et al. | |
| 9,341,843 B2 * | 5/2016 | Border | G06F 3/013 |
| 9,500,782 B2 | 11/2016 | Batchko et al. | |
| 9,846,306 B2 * | 12/2017 | Schowengerdt | G02B 27/0176 |
| 2008/0259471 A1 | 10/2008 | Chen et al. | |
| 2010/0128358 A1 * | 5/2010 | Szilagyi | G02B 3/14 |
| | | | 359/666 |
| 2012/0235886 A1 | 9/2012 | Border et al. | |
| 2016/0109705 A1 | 4/2016 | Schowengerdt | |
| 2017/0336637 A1 * | 11/2017 | Van Heugten | G02B 27/16 |
| 2019/0011612 A1 | 1/2019 | Mastrangelo et al. | |

OTHER PUBLICATIONS

Final Office Action for U.S. Appl. No. 15/495,463, dated Jun. 14, 2019.
Non-Final Office Action for U.S. Appl. No. 15/495,463, dated Oct. 1, 2019.
Non-Final Office Action for U.S. Appl. No. 15/495,463, dated Oct. 16, 2018.
Non-Final Office Action for U.S. Appl. No. 15/495,463, dated Sep. 17, 2020.
Notice of Allowance dated Jan. 21, 2021 for U.S. Appl. No. 15/495,463.

\* cited by examiner

INTERACTIVE VIRTUAL REALITY DISPLAY PROVIDING ACCOMMODATION DEPTH CUES

PRIORITY CLAIM

This application is a continuation of U.S. patent application Ser. No. 15/495,463 filed Apr. 24, 2017, the entire contents of which are incorporated herein by reference for all purposes. U.S. patent application Ser. No. 15/495,463 claims the priority benefit of U.S. Provisional Patent Application No. 62/326,677 filed Apr. 22, 2016, the entire contents of which are incorporated herein by reference for all purposes.

BACKGROUND

Head mounted displays (HMDs) for virtual reality, and more recently augmented reality, were first developed as early as the 1660's and have been improved upon in waves of technological development. The basic purpose of a HMD is to exploit the stereo nature of human visual perception to create a virtual 3D environment. The general approach employed by many current HMDs consists of a stereo pair of displays (LCD, LED, OLED, etc.) with an eyepiece lens disposed in front of each display, proximal to the eye of the user. The purpose of the eyepiece lenses is to create a virtual stereo 3D image from the displays, which appears to be located at a comfortable distance in front of the user's eyes so as to reduce eye strain. The effect of seeing a stereo 3D image is predominantly based on two physiological cues, stereopsis and vergence. Stereopsis is the difference between the scenes viewed by each eye, and vergence is the pointing of the eyes so that both are looking at the same point in space, or fixation point. The primary limitation to this type of display system is its failure to provide a third important physiological depth cue, accommodation. Accommodation is associated with the change in optical power of the human eye. As a person looks at objects which are different distances away, their eyes "accommodate" so that the objects they are looking at are in focus. In current typical HMDs, the user's eyes aren't provided cues to change accommodation and therefore are statically focused on the virtual image plane of the display, located at a fixed distance from the user as viewed through the eyepiece lenses. Virtual images which provide stereopsis and vergence, but not accommodation, may present a mismatch or ambiguity of visual depth cues to the user. This mismatch may cause a reduction in realism of the displayed image (in large part because all objects being displayed appear to be "in focus" regardless of distance from the user). Additionally, the user may suffer eye strain as the eyes are being forced to respond to the displayed imagery in an unnatural way, without the physiological function of accommodation.

BRIEF DESCRIPTION OF INVENTION

Aspects of the present disclosure overcome the limitations of existing technology by enabling HMDs with accurate accommodation depth cues, providing more realistic imagery and more comfortable use. According to an aspect of the present disclosure, an HMD for virtual reality or augmented reality applications uses variable focus lenses to provide accurate accommodation cues. In some embodiments the system may also include eye tracking capability to determine the proper focal power of the variable focus lenses.

BRIEF DESCRIPTION OF THE FIGURES

Objects and advantages of aspects of the present disclosure will become apparent upon reading the following detailed description and upon reference to the accompanying drawings in which.

DETAILED DESCRIPTION OF FIGURES

Although the following detailed description contains many specific details for the purposes of illustration, anyone of ordinary skill in the art will appreciate that many variations and alterations to the following details are within the scope of the invention. Accordingly, the aspects of the disclosure described below are set forth without any loss of generality to, and without imposing limitations upon, the claimed invention.

In the following detailed description, reference is made to the accompanying drawings, which form a part hereof, and in which is shown by way of illustration specific embodiments in which the invention may be practiced. In this regard, directional terminology, such as "top," "bottom," "front," "back," "first," "second," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
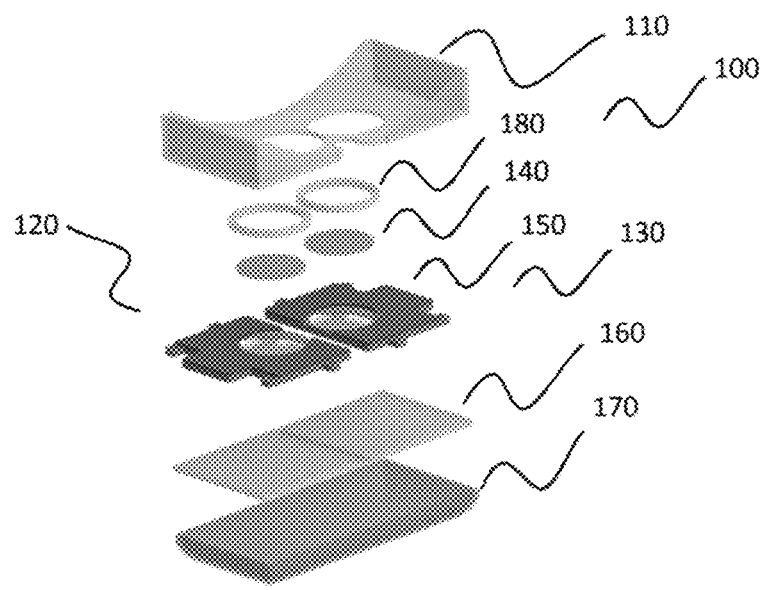
FIG. 1 depicts a variable collimation head mounted display exploded, labeled

FIG. 1 depicts an embodiment of a head mounted display (HMD), and more specifically, a variable accommodation HMD (VAHMD) device 100 according to the present invention. VAHMD 100 comprises a faceplate 110, a housing 170 which encloses first and second eyepiece assemblies, e.g., a left eyepiece assembly 120, and a right eyepiece assembly 130, respectively. Eyepiece assembly comprises an eye tracker 180, static lens 140, variable-focus lens 150, and display 160. Display 160 may be include any number of types of displays including but not limited to: LCD, OLED, LED-LCD, waveguide illuminated, holographic, light field, transparent, projected, direct retinal, or scanned laser. In some embodiments, the left and right eyepiece assemblies 120, 130 may share a single display. In an alternative embodiment, eye tracker 180 and/or static lens 140 may be integrated into variable focus lens 150. Alternatively, eye tracker 180 may be disposed separately from eyepiece assembly 130. In some implementations, the separation between the eyepiece assemblies 120, 130 can be adjustable to match the user's interpupillary distance. Static lens 140 may include any type of refractive or diffractive lens, prism, mirror or array thereof, including without limitation arrays of microlenses.

Figure 2:
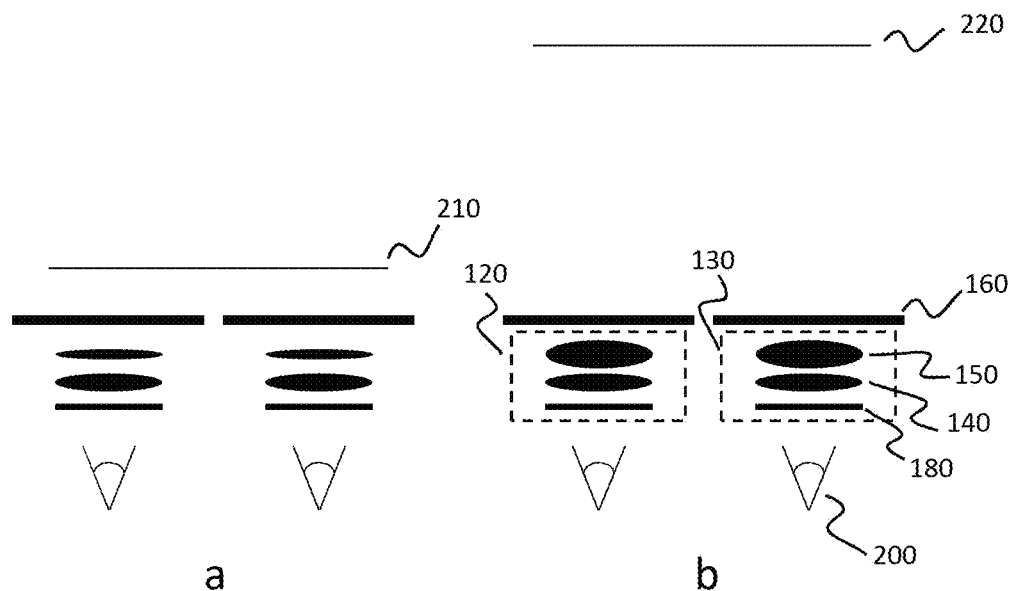
FIG. 2 is a schematic drawing of a moving virtual 3D image plane

FIG. 2 shows a schematic drawing of one embodiment of VAHMD 100. Eyepiece assemblies 120, 130 are disposed between the user's eyes 200 and display 160 and configured so that the user perceives a virtual stereo 3D image located at a virtual distance away. To ensure that the accurate accommodation visual cues are provided to the user, the virtual distance must be substantially identical to the user's natural fixation distance (i.e., the distance from the user's eyes to the fixation point in space) based on the scene being viewed. In some embodiments, the user's fixation distance may be determined by measuring the 3D coordinates of the user's fixation point with eye tracker 180. Alternatively, the user's fixation point or fixation distance may be determined by any other type of positional sensor, including but not limited to: integrated inertial measurement unit (IMU), integrated gyroscope, external optical tracking devices and methods, integrated time of flight sensor, simultaneous localization and measurement (SLAM) imaging system, or using the content of the displayed virtual image to encourage user to fixate (or, gaze) on a specific point. The virtual distance is controlled by adjusting the optical power of one or more variable-focus lenses 150. For example, FIG. 2a shows an example of a variable-focus lens 150 in a first state of actuation, causing a virtual stereo 3D image to appear at first specified virtual distance 210. Likewise, FIG. 2b shows an example of a variable-focus lens 150 in a second state of actuation, causing a virtual stereo 3D image to appear at a second specified virtual distance 220. In one embodiment, a controller, such as a computer or processor (not shown), is connected to VAHMD 100. The controller serves to interpret data from eye tracker 180 and provide control signals to the variable-focus lens(es) 150. The controller is configured in such a fashion that control signals serve to modify the optical properties of the eyepiece assembly 120 and variable focus lens(es) 150 so that the virtual distance is adjusted to be substantially identical to the fixation distance. In other embodiments the controller may be a processor (not shown) embedded in the VAHMD 100. Variable-focus lens(es) 150 may include any of the following group: lenses configured to have tunable focal power, fluidic lenses, liquid lenses, adaptive lenses, electrowetting lenses, liquid crystal lenses, mechanically moving lenses and autofocus lenses, lenses configured to have tunable tilt, switchable holographic optical elements, switchable diffractive optical elements, arrays of variable-focus microlenses, or any other technology for controlling the focal power, tilt, aperture size, or other optical property of a lens. In another embodiment, variable-focus lens(es) 150 may be disposed between display 160 and a partially reflective mirror (not shown) through which users eyes 200 may view the world while simultaneously viewing reflected imagery from display 160 to form an augmented reality display.

Figure 3:
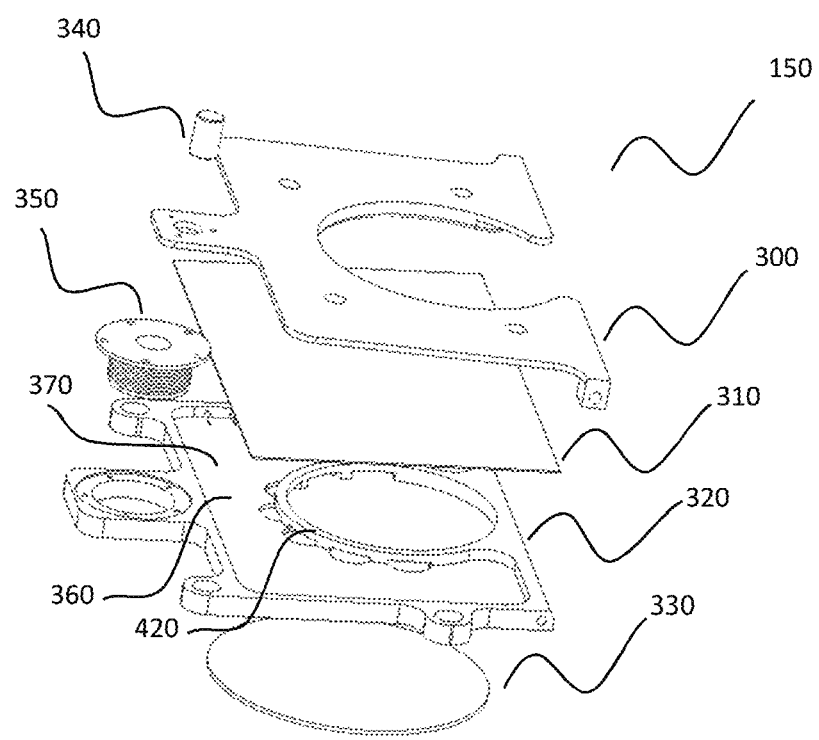
FIG. 3 is an exploded view of a variable-focus lens

FIG. 3 shows an exploded view of an example of a possible implementation of a variable-focus lens 150. In this example, the variable-focus lens 150 comprises a fluid chamber 360 substantially filled with a lens fluid 370, lens body 320, window 330, and membrane 310. In some embodiments, lens fluid 370 may be replaced by any other optical medium such as a gel or polymer. Lens body 320 encapsulated lens chamber 360. Variable-focus lens 150 may also include a displacement plate 300 configured to depress (i.e., apply an actuation force to) a portion of membrane 310. Depressing of membrane 310 by displacement plate 300 results in the actuation of variable-focus lens 150 and a corresponding change in its optical properties, such as focal power, from a first (non-actuated) state to second (actuated) state. Membrane 310 may be configured so that upon release of actuation force, variable-focus lens 150 returns from second (actuated) state to first (non-actuated) state. Displacement plate 300 may be controlled by movement of magnet 340 within solenoid 350. In a preferred embodiment of the present invention, window 330, membrane 310, and lens fluid 370 substantially transparent to light in the visible and/or infrared spectrum. Alternatively, window 330, membrane 310, and lens fluid 370 may be transparent to wavelengths of light in other portions of the electromagnetic spectrum. In other embodiments, magnet 340 and solenoid 350 may be replaced with any other form of actuator, such as a piezoelectric, MEMS, electrostatic, electroactive polymer, electric motor, ultrasonic motor, stepper motor, or pump, and appropriate mechanical linkages as will be generally understood by those skilled in the art of variable-focus lenses.

Figure 4:
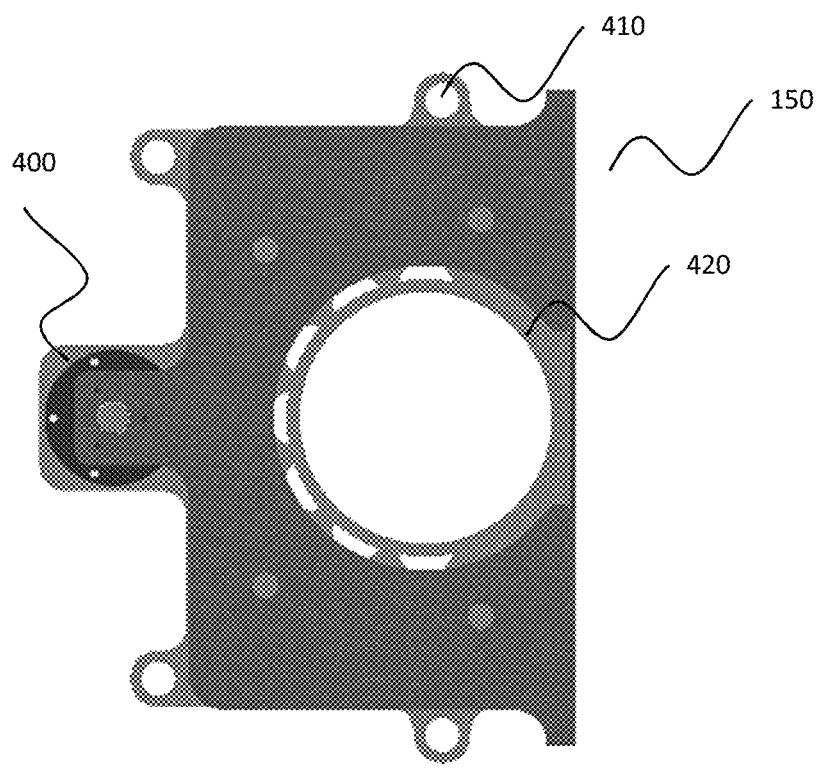
FIG. 4 is a top view of a variable-focus lens

FIG. 4 shows a top view of the variable-focus lens depicted in FIG. 3. The variable focus lens has a clear aperture 420 and mounting holes 410. When variable-focus lens 150 is actuated, the portion of membrane 310 within clear aperture 420 is configured to deform in a generally spherical manner causing the focal power of variable-focus lens 150 to change from first state to second state.

Figure 5:
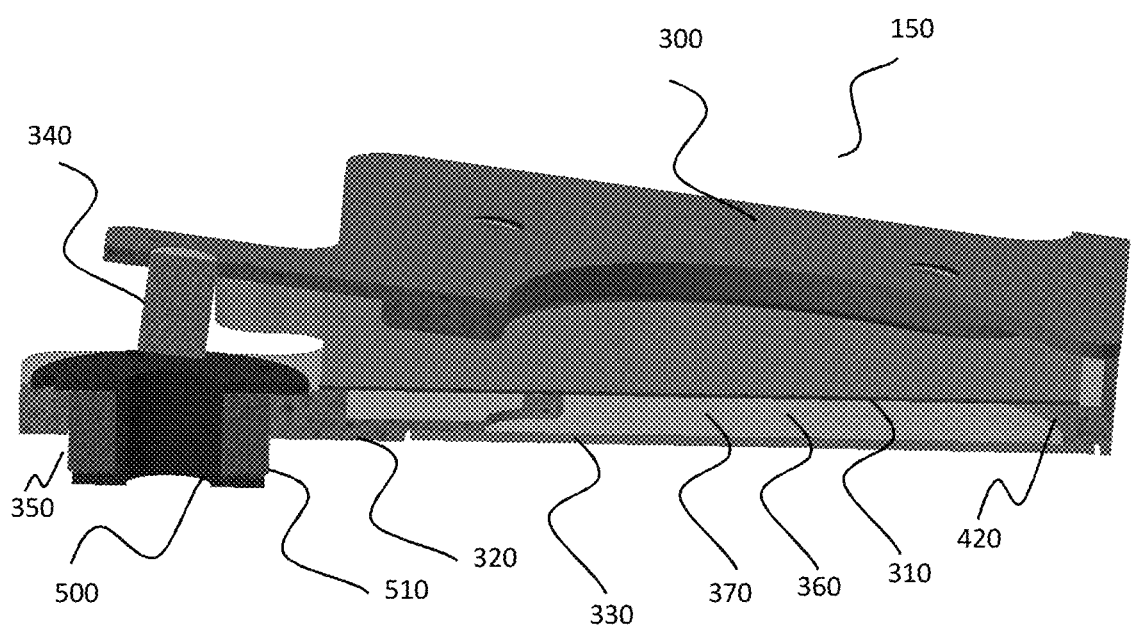
FIG. 5 is a cross-sectional view of a variable-focus fluidic lens

FIG. 5 shows a cross-sectional view of the variable-focus lens depicted in FIG. 3 and FIG. 4. Solenoid 350 is comprised of bobbin 500 and coils 510. The position of magnet 340 within bobbin 500 is dependent on the amount of electrical current, produced by a power source (not shown), flowing through coils 510. Magnet 340 is disposed in communication with displacement plate 300 in such a fashion that a movement of magnet 340 causes a translation of displacement plate 300 and a corresponding deformation of membrane 310 in the area outside clear aperture 420 (not shown). As the portion of membrane 310 outside clear aperture 420 (not shown) is deformed, the fluid 370 within fluid chamber 360 is also displaced, causing a substantially spherical deformation of a portion of membrane 310 located within clear aperture 420 and a corresponding change in the focal power of variable-focus lens 150. As is generally understood by those skilled in the optical arts, the term "clear aperture" (also known as free aperture or objective aperture) refers to the limited light-gathering area of an optical system. The area is normally restricted to an edge or outer surface of an individual component.

By way of example, and not by way of limitation, the clear aperture of a lens in most lens drawings refers to the full diameter of the lens through which light can pass.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

The invention claimed is:

1. An interactive virtual reality display, comprising;
   one or more display, capable of generating one or more displayed image;
   a first eyepiece assembly and second eyepiece assembly wherein each eyepiece assembly includes one or more variable-focus lenses, each variable focus lens having a clear aperture, wherein each of the one or more variable-focus lenses includes a lens body filled with a lens fluid disposed between a transparent membrane and a transparent window and a displacement plate configured to impinge on a portion of the membrane outside the clear aperture of the variable focus lens in response to an actuation force so that translation of the displacement plate causes a corresponding deformation of the transparent membrane in an area outside the clear aperture and causes a change in curvature of the transparent membrane thereby changing the optical properties of the variable-focus lens, wherein each of the one or more variable-focus lenses includes a mounting hole that is separate from the clear aperture and smaller than the clear aperture;

wherein the first and second eyepiece assemblies are configured to be disposed between the one or more display and first and second eyes of the user, respectively, when the virtual reality display is in use.

2. The system of claim 1, further comprising an eye tracking system capable of performing eye tracking on the user.

3. The system according to claim 1, further comprising a partially reflective mirror or beam splitter disposed between the variable focus lenses and the user's eyes to allow the user to simultaneously view the real world and the virtual imagery from the display.

4. The system according to claim 1 wherein the variable-focus lenses have a thin form factor to integrate well into a head mounted display device.

5. The system according to claim 1 wherein the body of the variable-focus lens is non-planar and is conformal to the shape of a human head and the curvature of a head mounted display.

6. The system according to claim 1 wherein the variable focus lenses may be independently controlled from each other.

7. The system from claim 1 wherein each of the eyepiece assemblies further comprises one or more static lens.

8. The system in claim 1 wherein the separation between the eyepiece assemblies can be adjusted to match the user's interpupillary distance.

9. The system in claim 1 wherein a portion of the variable-focus lens is integrated into the temples of a head mounted display.

10. The system from claim 1, further comprising an actuator configured to impart the actuation force to the displacement plate.

11. The system from claim 1, further comprising an actuator configured to impart the actuation force to the displacement plate, wherein the actuator is an electromagnetic actuator.

12. The system from claim 1, further comprising an actuator configured to impart the actuation force to the displacement plate, wherein the actuator is a piezoelectric actuator.

13. The system from claim 1, further comprising an actuator configured to impart the actuation force to the displacement plate, wherein the actuator is an electric motor.

14. The system from claim 1 wherein the interactive virtual reality display is part of a head-mounted display (HMD) that can be worn by the user.

15. An eyepiece assembly for interactive virtual reality display, comprising;

a variable-focus lens having a clear aperture a lens body filled with a lens fluid disposed between a transparent membrane and a transparent window, and a displacement plate configured to impinge on a portion of the membrane outside a clear aperture of the variable-focus lens in response to an actuation force so that translation of the displacement plate causes a corresponding deformation of the transparent membrane in an area outside the clear aperture and causes a change in curvature of the transparent membrane thereby changing in the focal properties of the variable-focus lens wherein each of the one or more variable-focus lenses includes a mounting hole that is separate from the clear aperture and smaller than the clear aperture.

16. The eyepiece assembly of claim 15, further comprising an actuator configured to impart the actuation force to the displacement plate.

17. The eyepiece assembly of claim 15, further comprising an actuator configured to impart the actuation force to the displacement plate, wherein the actuator is an electromagnetic actuator.

18. The eyepiece assembly of claim 15, further comprising an actuator configured to impart the actuation force to the displacement plate, wherein the actuator is a piezoelectric actuator.

19. The eyepiece assembly of claim 15, further comprising an actuator configured to impart the actuation force to the displacement plate, wherein the actuator is an electric motor.

\* \* \* \* \*